Nov. 14, 1961 H. P. HANNEKEN 3,008,752
SUPPORTING GLASS SHEETS
Filed Oct. 23, 1958

INVENTOR.
HENRY P. HANNEKEN
BY Oscar L. Spencer
ATTORNEY

United States Patent Office 3,008,752
Patented Nov. 14, 1961

3,008,752
SUPPORTING GLASS SHEETS
Henry P. Hanneken, Crystal City, Mo., assignor to Pittsburgh Plate Glass Company, a corporation of Pennsylvania
Filed Oct. 23, 1958, Ser. No. 769,160
4 Claims. (Cl. 294—118)

This invention relates to supporting glass sheets, and specifically refers to tongs for gripping glass sheets during thermal treatment. Tongs have been used for supporting glass sheets vertically for thermal treatment by gripping the opposite glass surfaces. The tongs are supported from an overhead monorail which extends through thermal treatment apparatus by means of a carriage that rides the monorail. Since glass sheets are heated to substantially the softening point during thermal treatment required for tempering or certain coating procedures, the tong points penetrate the glass surfaces and mar the latter. When coated or tempered glass sheets are used as viewing closures, it is necessary that the tong marks formed by tong penetration be kept close to the margin of the glass sheet so that they do not mar the vision area.

To avoid the presence of tong marks in the viewing area, glass sheet gripping tongs have been provided with a stop member to limit the uppermost position of the upper edge of the glass sheet supported between the tongs for tempering. In the past, the stop member comprised a stop pin welded to one of the tong arms below the common pivot point for the tongs and above the tong points.

When glass sheets are supported by tongs for tempering, their tong supporting carriages are usually moved in an intermittent action wherein the speed of movement of the glass sheets is relatively constant as the glass is transported through a heating oven. Then, the glass is accelerated and moved from the heating oven into a quenching station where the glass is stopped suddenly between opposed blasts of tempering nozzles. Upon any sudden change of motion, the glass commences to swing relative to the tong points. As the glass swings relative to the tong points, the prior art stop member pried the glass downwardly from between the tong points.

The present invention prevents this cause of breakage by providing glass support tongs with a different type of stop member for limiting the uppermost position of the top edge of a glass sheet supported for tempering. The stop member according to the present invention limits the uppermost position of the top edge of the glass sheet to one in a horizontal plane below the horizontal axis defined by the common hinge pin and above that of the tong points of the tongs as in the prior art. However, stop members according to the present invention comprise a pair of interconnected glass edge contacting arms flanking the tong points and extending parallel to the axis common to the tong points. A bracket interconnecting the arms is pivotally attached to at least one of said tong points. When glass sheets gripped by tongs are subjected to sudden changes in velocity, the interconnected arms of the stop member according to the present invention pivots with the upper edge of the glass sheet and the prying force characteristic of the prior art stop members is eliminated. Therefore, the present invention minimizes breakage which results when the glass sheets gripped by tongs are subjected to sudden changes of velocity and thereby caused to swing relative to the tong points during handling.

Typical embodiments of the present invention will now be described for purposes of illustrating the present invention. In the drawings which form part of the description:

Figure 1:
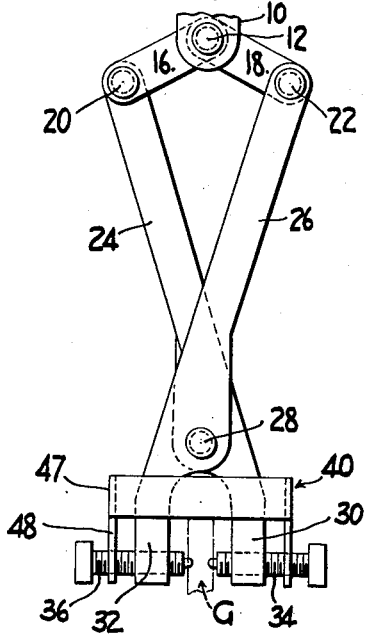
FIGURE 1 is an elevational view of a portion of a pair of glass supporting tongs taken across the thickness of a sheet of glass supported by said tongs.
Figure 2:
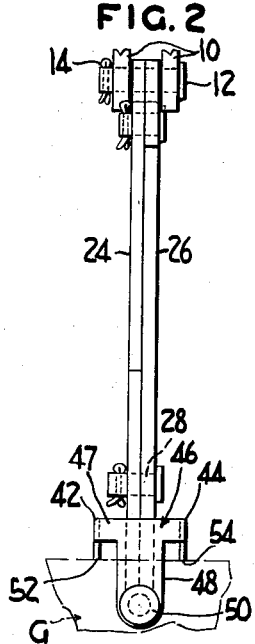
FIGURE 2 is a fragmentary view taken at right angles to the view of FIGURE 1.

Turning first to FIGURES 1 and 2, apertured support brackets are carried by a carriage (not shown) supported on a monorail (not shown) which extends through a heating furnace and a quenching or coating station. Since the heating furnace and quenching station are not part of the present invention, they will not be described in detail.

The apertured brackets provide a support 10 for a tong support pin 12 extending therethrough and secured in place by means of a cotter pin 14. Upper links 16 and 18 are pivoted to tong support pin 12 at their upper ends and at their bottom end carry one of a pair of link pins 20 and 22 which pivotally secure the upper links 16 and 18 to tong arms 24 and 26. A common hinge pin 28 pivotally secures tong arms 24 and 26 to each other.

Tong arm 24 terminates in a bottom portion 30, while tong arm 26 terminates in a bottom portion 32. The respective bottom portions are apertured to receive pointed screws 34 and 36 respectively. Pointed screws 34 and 36 form the tong points between which a glass sheet is gripped. The tong support pin 12, the link pins 20 and 22 and the common hinge pin 28 provide substantially parallel horizontal axes about which the upper links 16 and 18 and the tong arms 24 and 26 pivot relative to each other. The tong arms and links are so constructed that the tong points or pointed members 34 and 36 are urged to move toward each other to grip a sheet of glass therebetween.

According to one embodiment of the present invention, a stop member 40 provided with a pair of spaced, interconnected arms 42 and 44 is pivoted to the tong points 34 and 36. The arms 42 and 44 are interconnected by means of interconnecting brackets 46 which comprise an upper horizontal portion 47 interconnecting arms 42 and 44 and a depending flange 48 apertured at its bottom portion 50 to receive one of the tong points or pointed screws 34 or 36. Therefore, stop member 40 is free to pivot about an axis defined by the tong points 34 and 36.

Arms 42 and 44 are provided with bottom surfaces 52 and 54, respectively, for contacting the upper edge of a glass sheet G gripped by the tong points 34 and 36. When the glass sheet G begins to pivot about the tong points, the stop member 40 also pivots about the tong points. Since the lines of contact formed by the bottom surfaces 52 and 54 on the upper edge of the glass sheet G flank the pivot axis provided by the tong points 34 and 36, stop member 40 pivots with the glass sheet and does not provide a downward force tending to displace the glass sheet from between the tong points 34 and 36, and therefore represents an improvement over the prior art devices.

Figure 3:
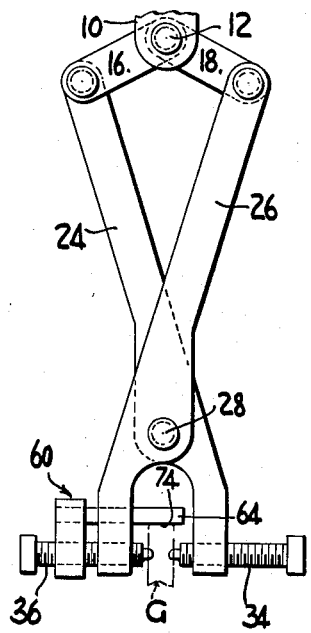
FIGURES 3 and 4 are views similar to FIGURES 1 and 2 of an alternate embodiment of the present invention.
Figure 4:
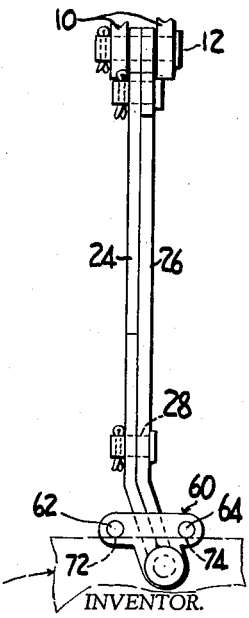

The embodiment disclosed in FIGURES 3 and 4 is similar to that of FIGURES 1 and 2 except that it comprises spaced, interconnected arms 62 and 64 that are interconnected at one end only by an interconnecting bracket 66 pivoted relative to pointed screw 36 instead of at both ends. Arms 62 and 64 have bottom surfaces 72 and 74 respectively which provide spaced, interconnected contacts for the upper edge of the glass sheet along lines flanking the pivot axis defined by the tong points 34 and 36.

Another difference between the embodiments of the first two figures and of the last two figures of the drawings is that arms 42 and 44 of the FIGURES 1 and 2 embodiment extend along axes that are equally distant radially from the pivot axis of stop member 40 defined by the engagement of the aperture of depending flange 48 with at least one of the tong points. This is ideal for gripping glass sheets small enough to be supported by a single pair of tong points. The embodiment of FIGURES 3 and 4 shows the radial distance between the pivot axis of stop member 60 and each of arms 62 and 64 to be different. This embodiment is suitable for use when a single sheet is so massive that it must be supported by at least two tongs each located to either side of the longitudinal center of the sheet it helps grip.

The particular structure described herein is for the purpose of illustrating rather than limiting the present invention. Reference to the latter may be obtained from studying the claims accompanying the present application.

What is claimed is:

1. In tongs for supporting a glass sheet comprising a tong support pin, a pair of link pins, a pair of upper links including an upper link pivotally connected at one end to the tong support pin and at its other end to one of said link pins, another upper link pivotally connected at one end to the tong support pin and at its other end to the other of said link pins, a common hinge pin, a pair of tong arms including a tong arm pivotally connected at one end to one of said link pins, another tong arm pivotally connected at one end to the other of said link pins, said common hinge pin pivotally connecting the other end of said one tong arm to the other end of said other tong arm, each tong arm having a portion extending below said common hinge pin, a tong point member carried by each said portion, each tong point member extending toward the other tong point member to provide opposed tong points, the links and tong arms being so constructed and arranged as to pivot relative to each other so that the tong points tend to move toward each other to grip a sheet of glass therebetween, the improvement comprising a stop member pivotally attached to said tongs, said stop member comprising a pair of interconnected arms flanking said tong points and extending in a plane between the axis of the common hinge pin and that of the tong points and means pivotally attached to at least one of said tong point members interconnecting the interconnected arms.

2. Apparatus as in claim 1, wherein the interconnecting means comprises a bracket having an upper member interconnecting one end of each of said arms and an apertured depending flange extending downwardly from the central portion of said upper member and pivoted to one of said tong point members.

3. Apparatus as in claim 2, wherein the interconnecting means comprises a pair of brackets, each pivoted to another of said tong point members.

4. Apparatus as in claim 1, wherein the arms are constructed and arranged to be spaced equal distances from the tong points when the stop member is disposed horizontally.

References Cited in the file of this patent

UNITED STATES PATENTS

| | | |
|---|---|---|
| 791,266 | Horn | May 30, 1905 |
| 1,406,704 | Varicle | Feb. 14, 1922 |
| 1,516,844 | Cross | Nov. 25, 1924 |
| 2,174,254 | Black | Sept. 26, 1939 |
| 2,618,505 | Rosenbaum | Nov. 18, 1952 |
| 2,806,734 | Klomp | Sept. 17, 1957 |

FOREIGN PATENTS

| | | |
|---|---|---|
| 455,300 | Great Britain | Oct. 19, 1936 |